United States Patent
Shen

(10) Patent No.: US 9,821,239 B2
(45) Date of Patent: Nov. 21, 2017

(54) PITCHING ARRANGEMENT FOR MODEL HELICOPTER

(75) Inventor: Anping Shen, Shenzhen (CN)

(73) Assignee: SHENZHEN SHEN'S TONGCHUANG AERONAUTIC MODEL CO., LTD., Shenzhen, Guangdong (CN)

( * ) Notice: Subject to any disclaimer, the term of this patent is extended or adjusted under 35 U.S.C. 154(b) by 1455 days.

(21) Appl. No.: 13/575,605

(22) PCT Filed: Sep. 1, 2011

(86) PCT No.: PCT/CN2011/079220
§ 371 (c)(1),
(2), (4) Date: Jul. 26, 2012

(87) PCT Pub. No.: WO2012/159386
PCT Pub. Date: Nov. 29, 2012

(65) Prior Publication Data
US 2016/0288006 A1    Oct. 6, 2016

(30) Foreign Application Priority Data

May 24, 2011 (CN) .................... 2011 2 0167635 U

(51) Int. Cl.
*A63H 27/00* (2006.01)
*B64C 27/04* (2006.01)
*A63H 29/22* (2006.01)
*A63H 30/04* (2006.01)

(52) U.S. Cl.
CPC ............. *A63H 27/12* (2013.01); *A63H 29/22* (2013.01); *A63H 30/04* (2013.01); *B64C 27/04* (2013.01)

(58) Field of Classification Search
CPC ........ A63H 27/00; A63H 27/02; A63H 27/12; A63H 31/00; B64C 27/00; B64C 27/04; B64C 27/06; B64C 27/32; B64C 27/52; B64C 27/54; B64C 27/605
See application file for complete search history.

(56) References Cited

U.S. PATENT DOCUMENTS

| 4,272,041 A * | 6/1981 | Mabuchi | A63H 27/12 244/17.21 |
| 5,609,312 A * | 3/1997 | Arlton | A63H 27/12 244/108 |
| 5,628,620 A * | 5/1997 | Arlton | A63H 27/12 416/103 |

(Continued)

FOREIGN PATENT DOCUMENTS

FR    2945269 A1 *  11/2010 ............. A63H 27/12

*Primary Examiner* — Gene Kim
*Assistant Examiner* — Alyssa Hylinski
(74) *Attorney, Agent, or Firm* — Raymond Y. Chan; David and Raymond Patent Firm

(57) ABSTRACT

A pitching arrangement for a model helicopter includes a securing base, a plurality of servers supported by the securing base, a main connecting shaft linked to the servers, a supporting ring, a control device operatively provided between the servers and axially mounted to the main connecting shaft, and a plurality of connecting rods connecting the servers and the control device through the main connecting shaft, wherein the supporting ring is mounted on the main connecting shaft, wherein the connecting rods are connected to the supporting ring of the main connecting shaft.

7 Claims, 6 Drawing Sheets

(56) References Cited

U.S. PATENT DOCUMENTS

| | | | | |
|---|---|---|---|---|
| 8,052,500 | B2* | 11/2011 | Van de Rostyne | A63H 27/12 244/17.11 |
| 8,096,497 | B2* | 1/2012 | Luo | A63H 27/12 244/17.17 |
| 8,460,050 | B2* | 6/2013 | Tu | A63H 27/12 244/17.11 |
| 9,434,472 | B2* | 9/2016 | Shen | A63H 31/08 |
| 2004/0184915 | A1* | 9/2004 | Kunii | A63H 27/04 416/114 |
| 2006/0266880 | A1* | 11/2006 | Chen | A63H 27/12 244/17.11 |
| 2007/0105475 | A1* | 5/2007 | Gotou | A63H 27/12 446/37 |
| 2007/0178798 | A1* | 8/2007 | Lai | A63H 27/12 446/36 |
| 2008/0031734 | A1* | 2/2008 | Chen | A63H 27/02 416/114 |
| 2008/0220687 | A1* | 9/2008 | Taya | A63H 30/04 446/37 |
| 2010/0084517 | A1* | 4/2010 | Benson | B64C 27/605 244/228 |

* cited by examiner

PITCHING ARRANGEMENT FOR MODEL HELICOPTER

BACKGROUND OF THE PRESENT INVENTION

Field of Invention

The present invention relates to a helicopter, and more particularly to a pitching arrangement implemented in a remote control toy helicopter.

Description of Related Arts

A conventional pitch control arrangement of a radio control model helicopter is usually provided on top of a main body of the model helicopter for altering the pitch and roll of the blades. The angle of attack of the main rotor blade is altered cyclically during rotation so as to create a different amount of lift at different points in the cycle. By altering the angle of attack of the main rotor blade during the cyclical rotation, a player of the model helicopter may be able to control a forward-backward and sideward movement of the helicopter. For this kind of conventional model helicopter, there exist a lot of components mounted on the main body of the model helicopter for controlling the angle of the main rotor blade. This causes complicated structure on the part of the pitch control arrangement and represents relatively high manufacturing and maintenance costs of the model helicopter. Moreover, mounting numerous components on the main body in a complicated manner inevitably increases an overall size of the model helicopter and this may not be desirable in many circumstances.

SUMMARY OF THE PRESENT INVENTION

The invention is advantageous in that it provides a pitching arrangement for a model helicopter, which utilizes a control device for controlling the direction of the model helicopter, wherein the control device is driven by servers such as servomechanism. Moreover, the present invention substantially decreases an overall size of the model helicopter so as to minimize the manufacturing cost and the maintenance cost of the present invention.

According to the present invention, the foregoing and other objects and advantages are attained by providing a pitching arrangement for a model helicopter, comprising a securing base, a plurality of servers supported by the securing base, a main connecting shaft communicated to the servers such as servomechanisms, a supporting ring, a control device operatively provided between the servers; and is axially mounted to the main connecting shaft, and a plurality of connecting rods connecting the servers and the control device through the main connecting shaft, wherein the supporting ring is mounted on the main connecting shaft, wherein the connecting rods are connected to the supporting ring of the main connecting shaft.

The securing base comprises an upper base member, a lower base member, a first hexagonal connecting member, a second hexagonal connecting member, wherein each of the lower base member and the upper base member are connected by the first hexagonal connecting member and the second hexagonal connecting member, wherein the servers are spacedly distributed in the securing base to form a triangular structure, wherein the control device is provided at the main connecting shaft.

Moreover, the pitching arrangement further comprises a motor having a driving shaft extended therefrom; and a deceleration mechanism, wherein the motor further comprises a driving gear and the deceleration mechanism is mounted on the lower base member, wherein the driving gear of the motor is connected to the deceleration mechanism, which is connected to the main connecting shaft.

The deceleration mechanism comprises a first decelerating gear, and a second decelerating gear, wherein the first decelerating gear is connected to the second hexagonal connecting member provided between the upper base member and the lower base member through a half-threaded screw, wherein the second decelerating gear is provided on the main connecting shaft, wherein the first decelerating gear is engaged with the second decelerating gear and the driving gear.

The control device comprises an outer controller, an inner controller, and a ball bearing, wherein the outer controller has a plurality of protruding elements spacedly protruded therefrom to define a plurality of controller slots between each two protruding elements, in such a manner that an angle of inclination of each two controller slots is approximately 120°, wherein the outer controller further comprises a plurality of controller arms movably mounted in the controller slots respectively in such a manner that each of the controller arms is capable of pivotally moving approximately 180°, wherein each of the controller arms further has a connecting head portion connected to a server ball joint of a corresponding server, wherein the ball bearing is provided in the outer controller, and comprises an outer bearing rim mounted in an outer controller cavity of the outer controller, wherein the inner controller is received in the inner bearing rim of the third ball bearing, and comprises a plurality of second ball joints spacedly and evenly protruded from an outer surface of the inner controller.

The inner controller which is received in the inner bearing rim of the ball bearing-comprises a plurality of ball joints spacedly and evenly protruded from an outer surface of the inner controller, wherein the control device is connected to the supporting rim of the main connecting shaft through the ball joints and the connecting rods.

The supporting rim of the main connecting shaft comprises a top cover, a spherical member, and a bottom cover having a circular hole, wherein the spherical member is rotatably accommodated in the circular hole of the bottom cover, wherein the bottom cover has a plurality of second ball joints spacedly formed thereon.

The top cover further has a plurality of third ball joints spacedly and evenly distributed at a 72° increment formed on an outer surface of the top cover.

The upper base member further has a through hole and a slider base provided in the through hole, wherein the connecting rods are passed through the slider base and the through hole, wherein the slider base further has an outer peripheral rim connected to a second ball bearing provided in the through hole.

The slider base has a plurality of U-shaped sliding slots, wherein the connecting rods are arranged to penetrate through the sliding slots to connect to the second ball joints of the inner controller respectively.

When compared to conventional arts, the present invention utilizes the control device for controlling the direction of the model helicopter, wherein the control device is driven by the servers. Moreover, the present invention also includes the decelerating mechanism so as to substantially decrease the overall size of the present invention. As such, the manufacturing cost and the maintenance cost of the present invention will also be minimized.

BRIEF DESCRIPTION OF THE DRAWINGS

FIG. 3-1 is a first schematic diagram of the pitching arrangement for a model helicopter according to the above preferred embodiment of the present invention.

FIG. 3-2 is a left side view of the schematic diagram shown in FIG. 3-1.

FIG. 3-3 is a right side view of the schematic diagram shown in FIG. 3-1.

FIG. 3-4 is a plan view of the schematic diagram shown in FIG. 3-1.

FIG. 3-5 is a bottom view of the schematic diagram shown in FIG. 3-1.

FIG. 3-6 is a rear view of the schematic diagram shown in FIG. 3-1.

FIG. 4 is a supporting ring of the pitching arrangement for a model helicopter according to the above preferred embodiment of the present invention.

FIG. 5 is a schematic diagram of the control device of the pitching arrangement for a model helicopter according to the above preferred embodiment of the present invention.

FIG. 6 is a schematic diagram of the slider base of the pitching arrangement for a model helicopter according to the above preferred embodiment of the present invention.

DETAILED DESCRIPTION OF THE PREFERRED EMBODIMENT

Figure 1:
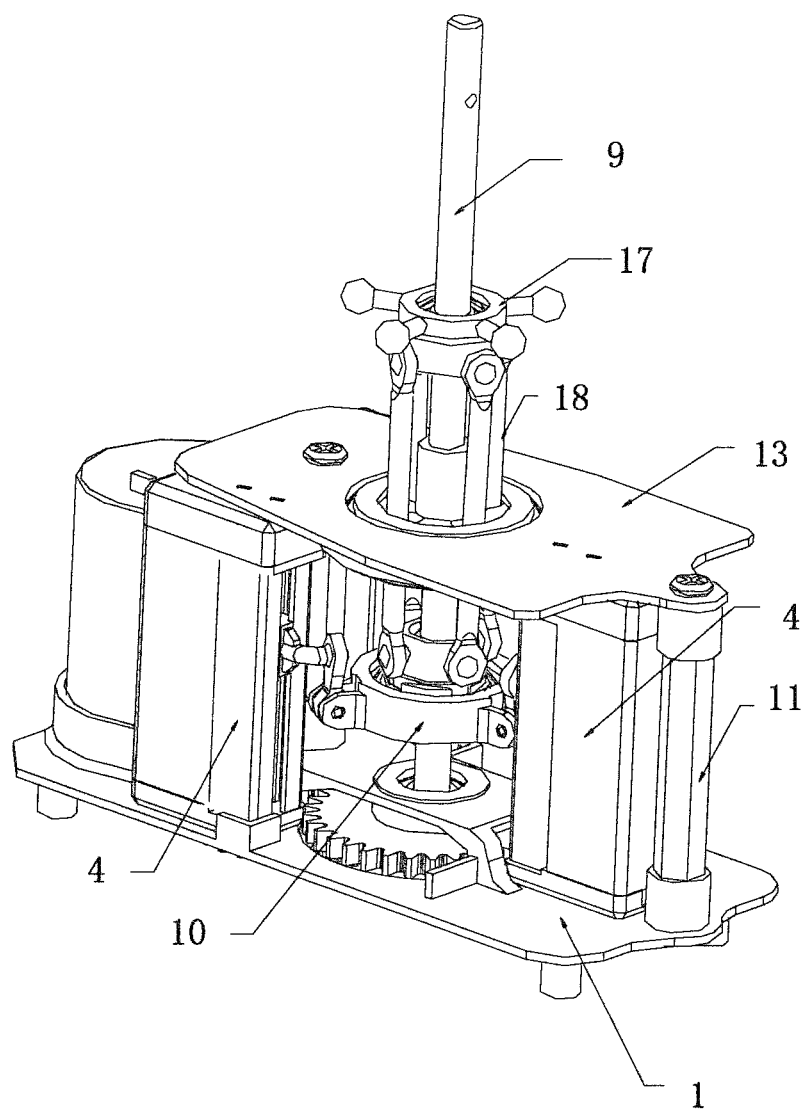
FIG. 1 is a perspective view of a pitching arrangement for a model helicopter according to a preferred embodiment of the present invention.
Figure 2:
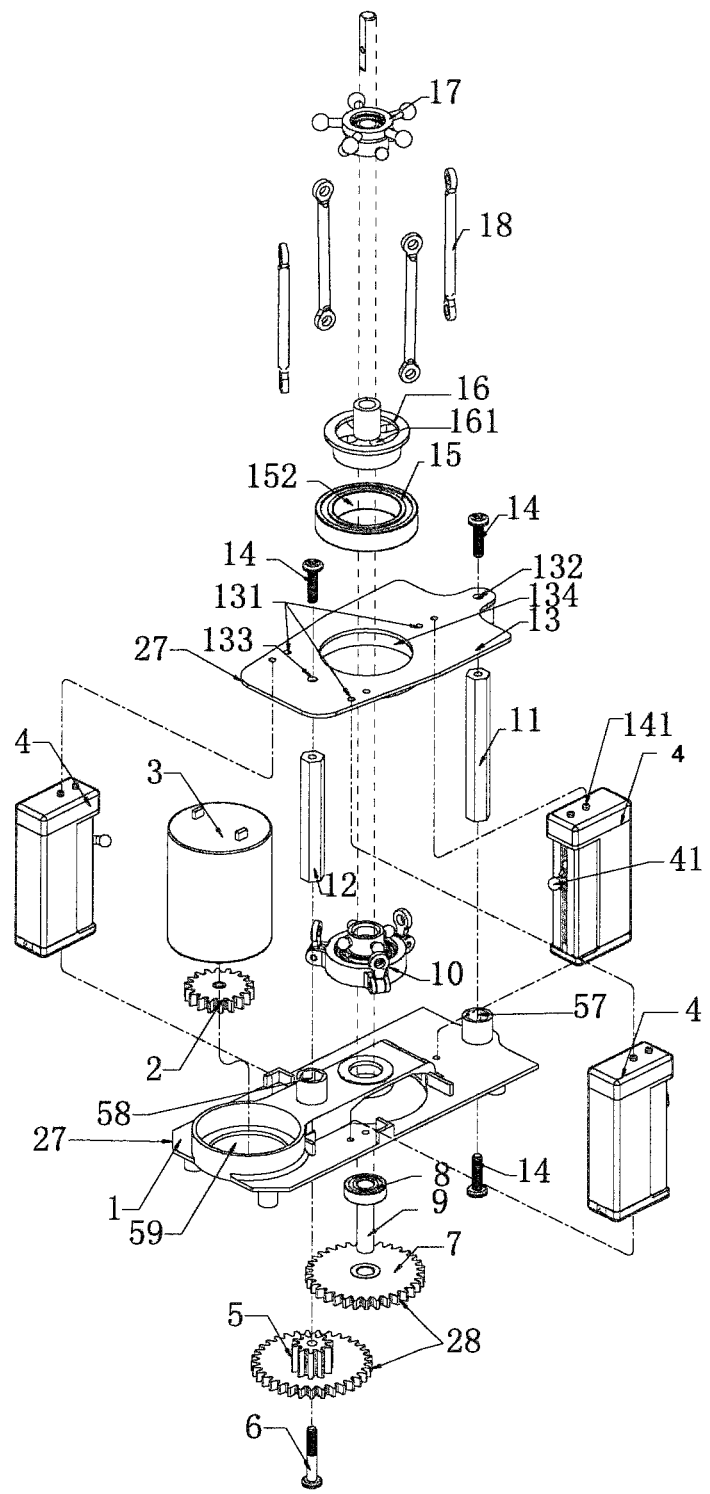
FIG. 2 is an exploded perspective view of the pitching arrangement for a model helicopter according to the above preferred embodiment of the present invention.

The present invention is clearly described below with reference to the drawings and the preferred embodiment of the present invention. Referring to FIG. 1 to FIG. 2, FIG. 3-1, FIG. 3-2, FIG. 3-3, FIG. 3-4, FIG. 3-5, and FIG. 3-6 of the drawings, the pitching arrangement for a model helicopter comprises a securing base 27 comprising an upper base member 13 and a lower base member 1. The pitching arrangement further comprises a plurality of servers 4, such as servomechanism, supported by the securing base 27. More specifically, there are three servers 4 mounted in the securing base 27 wherein each of the servers 4 has a plurality of connecting shafts 141 provided at a top end portion and a bottom end portion thereof. Furthermore, the upper base member 13 has a plurality of through holes 131 while the lower base member 1 has a plurality of securing holes 55 wherein each of the servers 4 is mounted between the upper base member 13 and the lower base member 1 through the through holes 131 and the securing holes 55. The pitching arrangement further comprises a motor 3 having a driving shaft extended therefrom, whereas the lower base member 1 further has a motor connection hole 59 wherein the driving shaft of the motor 3 is connected to the motor connection hole 59. In addition, the motor 3 further comprises a driving gear 2 whereas the pitching arrangement further comprises a deceleration mechanism 28 mounted on the lower base member 1, wherein the driving gear 2 of the motor 3 is connected to the deceleration mechanism 28, which is connected to a main connecting shaft 9. The pitching arrangement further comprises a control device 10 which is operatively provided between the servers 4 and axially mounted to the main connecting shaft 9, and a plurality of connecting rods 18 connecting the servers 4 and the control device 10 through the main connecting shaft 9. More specifically, the connecting rods 18 are arranged connecting with the control device 10 with the main connecting shaft 9. On the other hand, the upper base member 13 further has at least a through hole 134 and a slider base 16 provided in the through hole 134, wherein the connecting rods 18 are operatively arranged to connect the slider base 16 through the through hole 134 with the main connecting shaft 9. Furthermore, the main connecting shaft 9 further has a supporting ring 17 mounted thereon, wherein the connecting rods 18 are connected to the supporting ring 17 of the main connecting shaft 9. The slider base 16 further has an outer peripheral rim 163 which is connected to a second ball bearing 15.

Each of the lower base member 1 and the upper base member 13 are connected by the connection of a first hexagonal connecting member 11, a second hexagonal connecting member 12, a first hexagonal slot 57, a second hexagonal slot 58, a second hole 132, a third hole 133, a fully-threaded screw 14, and a half-threaded screw 6.

The deceleration mechanism 28 comprises a first decelerating gear 5, and a second decelerating gear 7, wherein the first decelerating gear 5 is connected to the second hexagonal connecting member 12 provided between the upper base member 13 and the lower base member 1 through the half-threaded screw 6. The second decelerating gear 7 is provided on the main connecting shaft 9, wherein the first decelerating gear 5 is engaged with the second decelerating gear 7 and the driving gear 2.

The second decelerating gear 7 is supported by a first ball bearing 8 provided between the second decelerating gear 7 and the lower base member 1. The first ball bearing 8 is also provided on the main connecting shaft 9.

The second ball bearing 15 is provided in the through hole 134, and is operatively communicated to the outer peripheral rim 163 of the slider base 16.

Figures 1, 3:
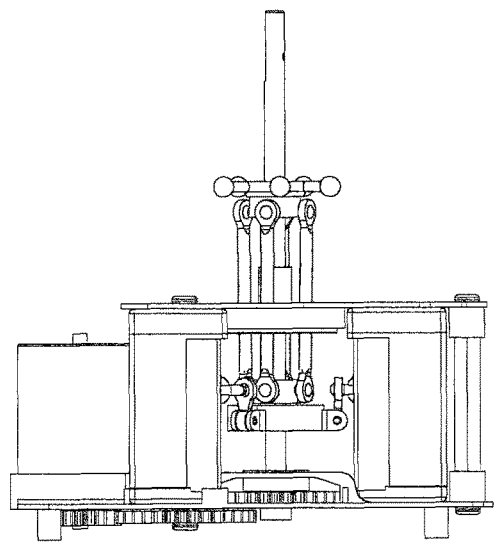
Figures 2, 3:
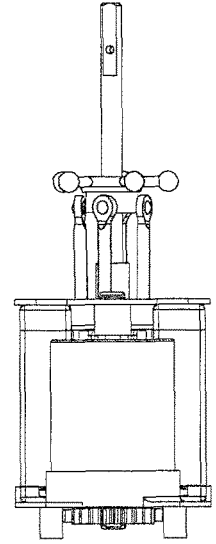
Figure 3:
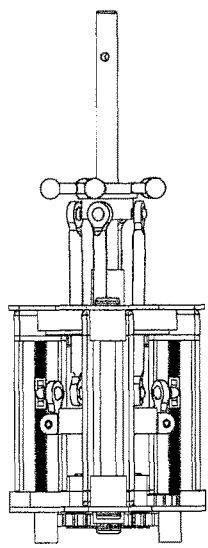
Figures 3, 4:
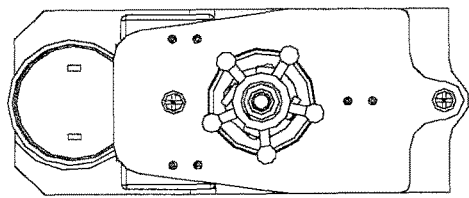

Referring to FIG. 4 of the drawings, the supporting rim 17 of the main connecting shaft 9 comprises a top cover 19, a spherical member 21, and a bottom cover 20 having a circular hole 203, wherein the spherical member 21 is rotatably accommodated in the circular hole 203 of the bottom cover 20. Moreover, the top cover 19 has a top cover hole 191 which is arranged to connect to an outer cover rim 201 of the bottom cover 20. In addition, the bottom cover 20 has a plurality of third ball joints 202 spacedly formed thereon, wherein the top cover 19 further has a plurality of fourth ball joints 192 spacedly and evenly distributed (at a 72° increment) formed on an outer surface of the top cover 19. The third ball joints 202 are connected to the connecting rods 18 respectively while the spherical member 21 connects the supporting ring 17 to the slider base 16 while the main connecting shaft 9 penetrating therethrough.

Figures 3, 4, 5:
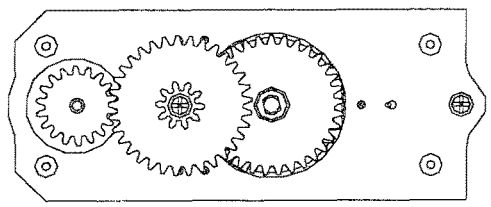

Referring to FIG. 5 of the drawings, the control device 10 comprises an outer controller 23, an inner controller 22, and a third ball bearing 2, wherein the outer controller 23 has a plurality of protruding elements 232 spacedly protruded therefrom to define a plurality of controller slots 233 between each two protruding elements 232, in such a manner that an angle of inclination of each two controller slots 233 is approximately 120°. Moreover, the outer controller 23 further comprises a plurality of controller arms 26 movably mounted in the controller slots 233 respectively in such a manner that each of the controller arms 26 is capable of pivotally moving approximately 180°. Each of the controller arms 26 is pivotally mounted to the corresponding protruding elements 232 through pivots 25 respectively. Each of the controller arms 26 further has a connecting head portion 261 connected to a server ball joint 41 of a corresponding server 4. The third ball bearing 2 is provided in the outer controller 23, and comprises an outer bearing rim 241 mounted in an outer controller cavity 231 of the outer controller 23. On the other hand, the inner controller 22 is received in the inner bearing rim 242 of the third ball bearing 2, and comprises a plurality of second ball joints 222 spacedly and evenly protruded from an outer surface of the inner controller 22, wherein the control device 10 is connected to the supporting ring 17 of the main connecting shaft 9 through the second ball joints 222 and the corresponding connecting rods 18.

Figures 3, 4, 5, 6:
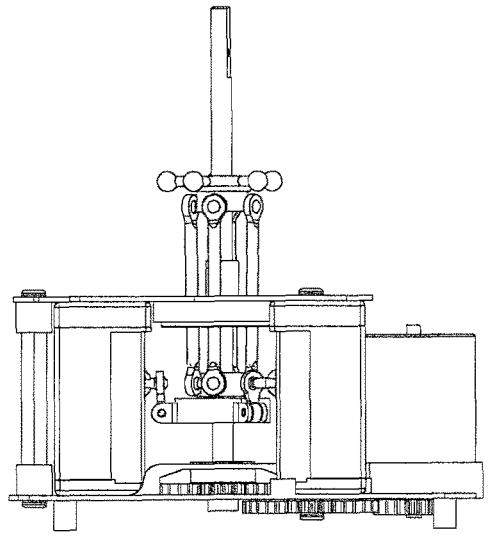
Figure 4:
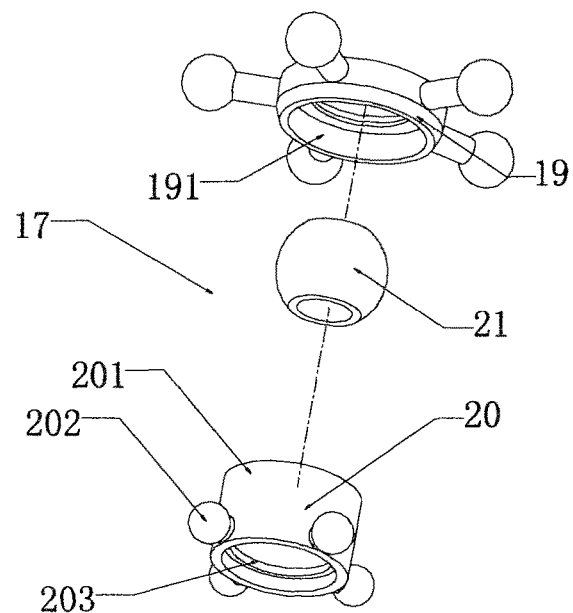
Figure 5:
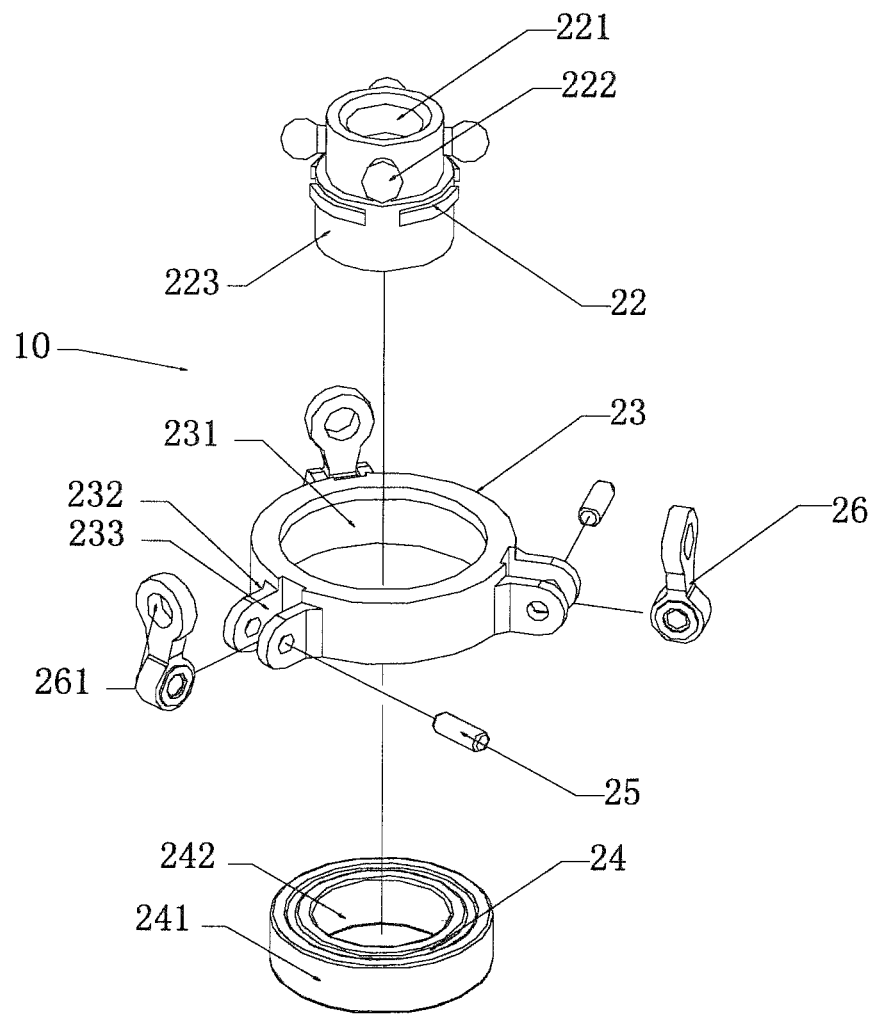
Figure 6:
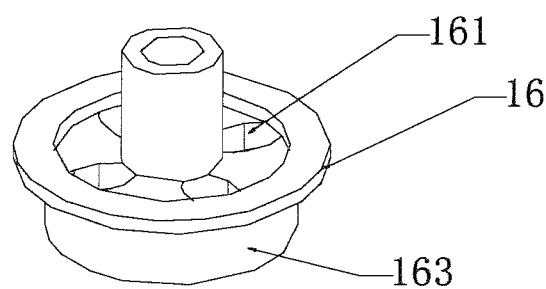

Referring to FIG. 6 of the drawings, the slider base 16 has a plurality of U-shaped sliding slots 161, wherein the connecting rods 18 are arranged to penetrate through the sliding slots 161 to connect to the corresponding second ball joints 222 of the inner controller 22. Moreover, the slider base 16 is connected to the upper base member 13 through connecting the outer peripheral rim 163 to an inner bearing slot 152 of the second ball bearing 15.

Figure 7:
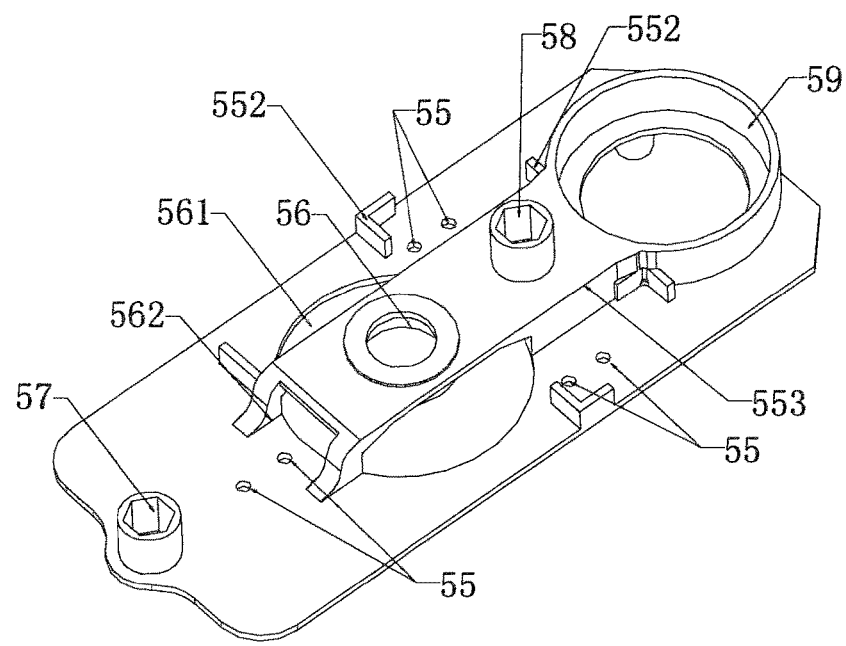
FIG. 7 is a schematic diagram of the lower base member of the pitching arrangement for a model helicopter according to the above preferred embodiment of the present invention.

Referring to FIG. 7 of the drawings, the lower base member 1 has a rectangular cross section, and has a securing slot 59 formed at one end portion thereof, a plurality of server securing holes 55 spacedly formed at a rear portion of the lower base member 1, a first blocking member 551, a second blocking member 552 and a supporting platform 553 formed on the lower base member 1, wherein the second hexagonal slot 58 is formed on the supporting platform 553 of the lower base member 1. The second hexagonal connecting member 12 is mounted in the second hexagonal slot 58. In addition, the lower base member 1 further has a first bearing connecting hole 56 and a first ball bearing 8 mounted at the first bearing connecting hole 56. The lower base member 1 further has a decelerating gear hole 561 formed thereon, wherein the second decelerating gear 7 is supported at the decelerating gear hole 561. The supporting platform 553 has a sever slot 562 formed at a rear portion thereof, wherein the corresponding server 4 is mounted at the server slot 562. Moreover, the lower base member 1 further has a first hexagonal slot 57, wherein the first hexagonal connecting member 11 is mounted at the first hexagonal slot 57.

Figure 8:
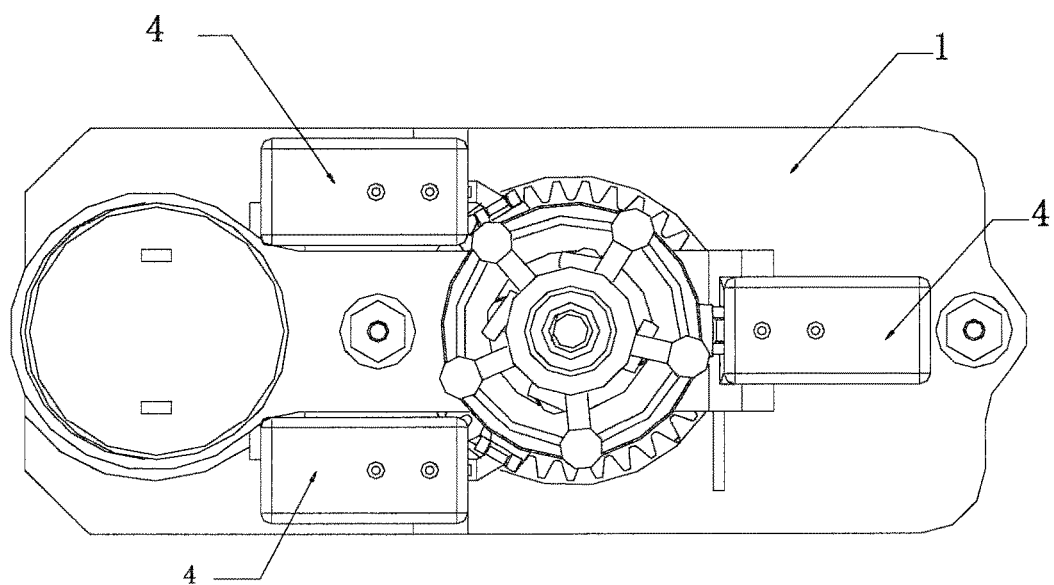
FIG. 8 is another schematic diagram of the pitching arrangement for a model helicopter according to the above preferred embodiment of the present invention.

Referring to FIG. 8 of the drawings, the server 4 is spacedly provided on two front side portions and a rear portion of the lower base member 1 respectively.

It is worth mentioning that the present invention does not involve the use of any Integrated Circuit. All control signals are transmitted from an external device. When the control signal is such that the model helicopter is to be go up or down, the servers 4 are arranged to raise or lower the corresponding controller arms 26 and the control device 10, which drives the corresponding connecting rods 18 and the supporting rim 17 to move through the second ball joints 222. When the control signal is such that the helicopter is to move forward, the server 4 which is positioned at the rear portion of the lower base member 1 is arranged to descend, while the servers 4 which are provided at two sides of the front end portion of the lower base member 1 are arranged to ascend. When the control signal is such that the helicopter is to move backward, the server 4 which is positioned at the rear portion of the lower base member 1 is arranged to ascend, while the servers 4 which are provided at two sides of the front end portion of the lower base member 1 are arranged to descend. When the control signal is such that the helicopter is to perform a left turn, the server 4 which is provided at a left side of the front end portion of the lower base member 1 are arranged to descend, while the server 4 which is provided at a right side of the front end portion of the lower base member 1 are arranged to ascend. When the control signal is such that the helicopter is to perform a right turn, the server 4 which is provided at a left side of the front end portion of the lower base member 1 are arranged to ascend, while the server 4 which is provided at a right side of the front end portion of the lower base member 1 are arranged to descend. When a user wishes to control the direction of the model helicopter, the corresponding servers 4 are arranged to control the movement of the controller arms 26 through the server ball joint 41. The controller arms 26 are arranged to drive the control device 10 to move for moving the supporting rim 17 and the connecting rods 18.

The present invention utilizes the control device 10 for controlling the direction of the model helicopter, wherein the control device 10 is driven by the servers 4. Moreover, the present invention also includes the decelerating mechanism 28 so as to substantially decrease the overall size of the present invention. As such, the manufacturing cost and the maintenance cost of the present invention will also be minimized.

What is claimed is:

1. A pitching arrangement for a model helicopter, comprising a securing base, a plurality of servers, a main connecting shaft connected to said servers, a supporting ring mounted on said main connecting shaft, a control device operatively provided between said servers and axially mounted to said main connecting shaft, a plurality of connecting rods connecting with said control device, a motor having a driving shaft extending therefrom, and a deceleration mechanism, wherein said connecting rods are connected to said supporting ring, wherein said securing base comprises an upper base member, a lower base member, a first connecting member, and a second connecting member, wherein each of said lower base member and said upper base member are connected by said first connecting member and said second connecting member, wherein said servers are spacedly distributed in said securing base to form a triangular structure, wherein said motor further comprises a driving gear connected to said deceleration mechanism which is mounted on said lower base member, wherein said deceleration mechanism comprises a first decelerating gear and a second decelerating gear, wherein said first decelerating gear is connected to said second connecting member provided between said upper base member and said lower base member through a half-threaded screw, wherein said second decelerating gear is provided on said main connecting shaft, wherein said first decelerating gear is engaged with said second decelerating gear and said driving gear.

2. The pitching arrangement, as recited in claim 1, wherein said control device comprises an outer controller, an inner controller, and a ball bearing, wherein said outer controller has a plurality of protruding elements spacedly protruded therefrom to define a plurality of controller slots between pairs of said protruding elements, in such a manner that an angle of inclination between said two controller slots is approximately 120°, wherein said outer controller further comprises a plurality of controller arms movably mounted in said controller slots respectively in such a manner that each of said controller arms is capable of pivotally moving—approximately 180°, wherein each of said controller arms further has a connecting head portion connected to a server ball joint of one of said servers, wherein said ball bearing is provided in said outer controller, and comprises an outer bearing rim mounted in an outer controller cavity of said outer controller, wherein said inner controller which is received in an inner bearing rim of said ball bearing comprises a plurality of first ball joints spacedly and evenly protruded from an outer surface of said inner controller.

3. The pitching arrangement, as recited in claim 2, wherein said control device is connected to said supporting ring of said main connecting shaft through said first ball joints and said connecting rods.

4. The pitching arrangement, as recited in claim 3, wherein said supporting ring of said main connecting shaft comprises a top cover, a spherical member, and a bottom cover having a circular hole, wherein said spherical member is rotatably accommodated in said circular hole of said bottom cover, wherein said bottom cover has a plurality of second ball joints spacedly formed thereon.

5. The pitching arrangement, as recited in claim 4, wherein said top cover further has a plurality of third ball joints spacedly and evenly distributed at a 72° increment formed on an outer surface of said top cover.

6. The pitching arrangement, as recited in claim 5, wherein said upper base member further has a through hole and a slider base provided in said through hole, wherein said connecting rods are-passed through said slider base and said through hole, wherein said slider base further has an outer peripheral rim connected to a second ball bearing provided in said through hole.

7. The pitching arrangement, as recited in claim 6, wherein said slider base has a plurality of U-shaped sliding slots, wherein said connecting rods are arranged to penetrate through said U-shaped sliding slots to connect to said first ball joints of said inner controller respectively.

\* \* \* \* \*